P. ANTONIDES.
Potato-Digger.
No. 41,739.
Patented Feb. 23, 1864.
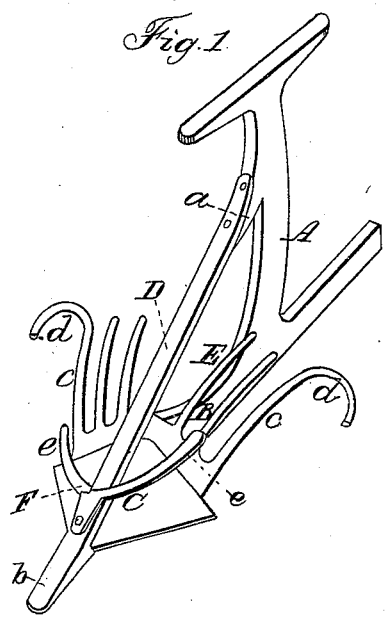
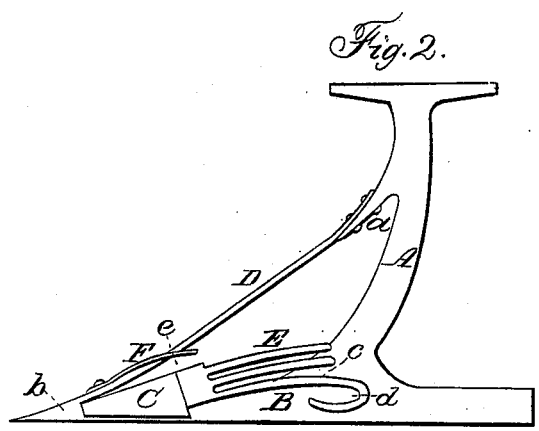
Witnesses
J W Coombs
G W Reed
Inventor.
Peter Antonides
per Munn & Co.
Attorneys

UNITED STATES PATENT OFFICE.

PETER ANTONIDES, OF FREEHOLD, NEW JERSEY, ASSIGNOR TO HIMSELF AND GEORGE W. MAYHER, OF NEW YORK, N. Y.

IMPROVEMENT IN POTATO-DIGGERS.

Specification forming part of Letters Patent No. 41,739, dated February 23, 1864.

*To all whom it may concern:*

Be it known that I, PETER ANTONIDES, of Freehold, in the county of Monmouth and State of New Jersey, have invented a new and Improved Potato-Digger; and I do hereby declare that the following is a full, clear, and exact description of the same, reference being had to the accompanying drawings, making a part of this specification, in which—

Figure 1 is a perspective view of my invention; Fig. 2, a side view of the same.

Similar letters of reference indicate corresponding parts in the two figures.

This invention relates to an improvement in that class of potato-diggers which are composed of a share with a screen attached to its back end.

The invention consists in attaching to the front part of a potato-digger of this kind a fork arranged in such a manner as to effect a partial separation of the earth from the potatoes before the latter fall or pass upon the screen, thereby relieving the screen or greatly aiding it in its work.

The invention further consists in having the outer prongs of the screen at each side formed with hooks at their ends in order to level the ridges of earth formed at each side of the implement as it is drawn along and to separate the potatoes therefrom, so that they will be left upon the top of the earth.

To enable those skilled in the art to fully understand and construct my invention, I will proceed to describe it.

A represents the standard of the implement, and B the sole-bar thereof. These parts may be of cast-iron. C is a share, which is also of cast-iron, and is bolted to the front end of the sole-bar. This share is of the double-inclined form, and is attached centrally to the sole-bar. (See Fig. 1.)

D is an inclined wrought-iron bar, one end of which is bolted to an arm, *a*, which projects from the standard A, and the opposite end is provided with a steel point, *b*, which is in front of the share C and forms the point of the same, as shown in both figures, the front part of the bar D being attached to the front part of the share C by a bolt. The bar D is directly over the center of the share C.

E is a wrought-iron screen which is attached to the sole-bar B, directly back of the share C. This screen is of double-inclined form, like the share C, and it projects at equal distances at each side of the sole-bar. The screen E is of the usual form, with the exception that the outer prongs, *c*, are bent around at their ends in hook form, as shown at *d* in both figures.

To the front part of the bar D, at its upper surface, there is secured a fork, F, the prongs *c* of which project one from each side of the bar D. This fork is directly over the share C, and it may be constructed of wrought-iron.

The operation is as follows: As the machine is drawn along the share C enters the hill or drill and plows up the earth and potatoes. The fork F effects a partial separation of the potatoes from the earth, while the inclined bar D prevents weeds, grass, and other trash from falling upon the screen E. The screen E, in consequence of its inclined sides, will throw a small ridge of earth at each side, and these ridges are leveled by the hooks *d* of the prongs *c*, and the potatoes in said ridges brought to the surface by the hooks.

This invention has been practically tested and has been found to answer an admirable purpose. The difficulty attending the digging of potatoes with a machine in weedy or grassy ground is obviated, and the potatoes are all dug out of the earth and left upon the surface.

I do not claim the share C and screen E, for they have been previously used; but I do claim as new and desire to secure by Letters Patent—

1. The fork F, attached to the front part of the bar D, when used in combination with the share C and screen E, as and for the purpose specified.

2. The hooks or curved terminals *d* at the ends of the prongs *c* of the screen E, substantially as and for the purpose specified.

PETER ANTONIDES.

Witnesses:
JAMES YOUNG,
SAMUEL B. BALL.